No. 850,545. PATENTED APR. 16, 1907.
G. RISCHMULLER.
DOOR CLOSER AND CHECK.
APPLICATION FILED JUNE 7, 1905.
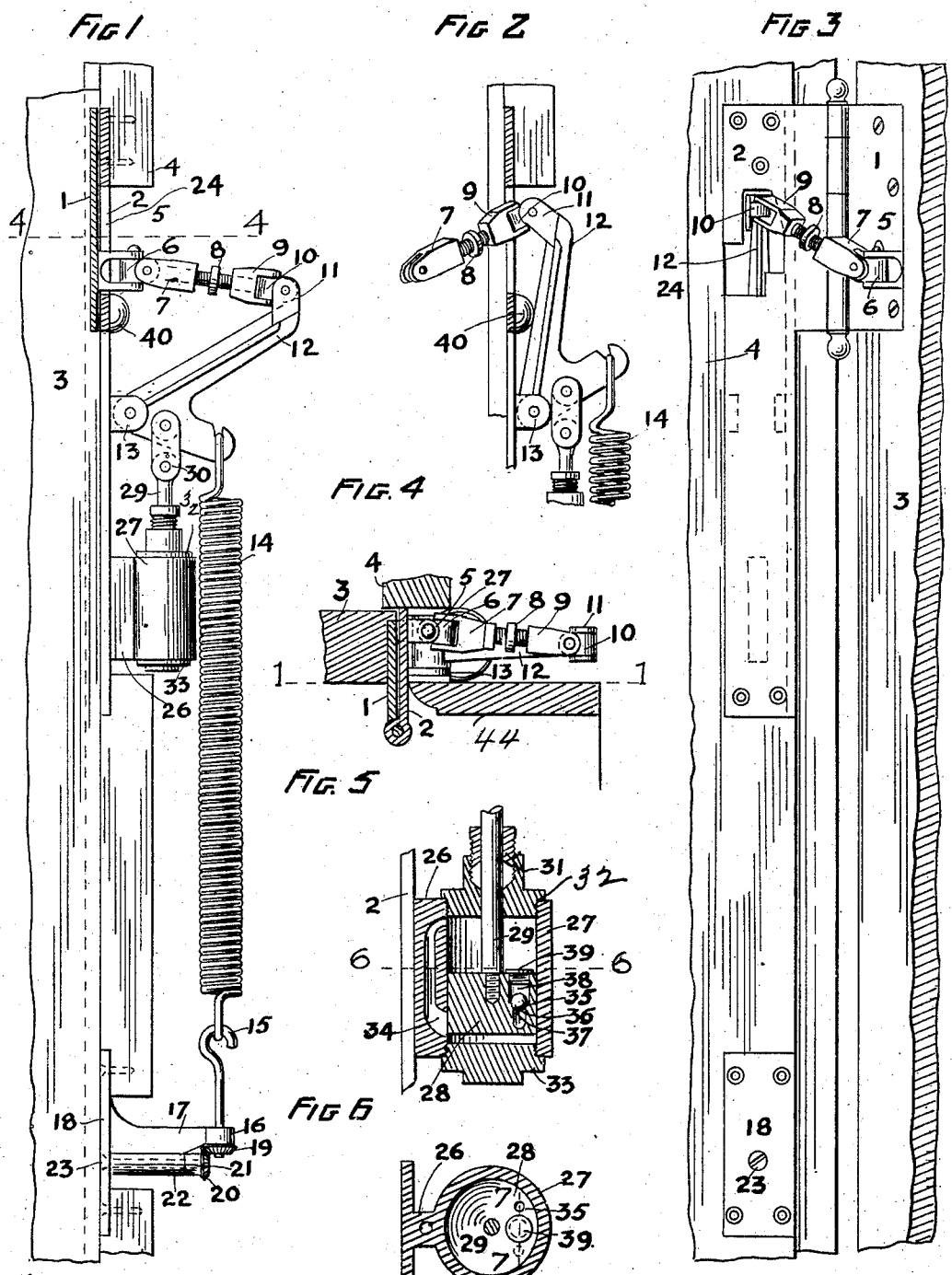
WITNESSES:
INVENTOR:
Geo. Rischmuller,
By F. W. Wright,
Attorney.

UNITED STATES PATENT OFFICE.

GEORGE RISCHMULLER, OF SAN FRANCISCO, CALIFORNIA.

DOOR CLOSER AND CHECK.

No. 850,545.   Specification of Letters Patent.   Patented April 16, 1907.

Application filed June 7, 1905. Serial No. 264,157.

*To all whom it may concern:*

Be it known that I, GEORGE RISCHMULLER, a citizen of the United States, residing at San Francisco, in the county of San Francisco and State of California, have invented certain new and useful Improvements in Door Closers and Checks, of which the following is a specification.

This invention relates to improvements in door closers and checks, the invention consisting in the novel construction, arrangement, and combination of parts thereof.

In the accompanying drawings, Figure 1 is a vertical section on the line 1 1 of Fig. 4. Fig. 2 is a side view of portions of the jamb and door, the latter open. Fig. 3 is a view similar to Fig. 1, showing the upper parts thereof in the position when the door is opened. Fig. 4 is a horizontal section on the line 4 4 of Fig. 1. Fig. 5 is an enlarged vertical section through the cylinder. Fig. 6 is a horizontal section on the line 6 6 of Fig. 5. Fig. 7 is a vertical section on the line 7 7 of Fig. 6.

Referring to the drawings, 1 2 indicate hinge-plates secured, respectively, to the door 3 and jamb 4 therefor. The hinge-plate 1 is formed with ears 5, between which is pivoted a short arm 6, which in its turn is pivoted to the end of a forked link-section 7, connected by a turnbuckle 8 to a second forked link-section 9, pivoted to a short arm 10, which in its turn is pivoted to the forked end of an arm 11 of a bell-crank lever 12, pivoted between ears 13, extending rearwardly from the hinge-plate 2.

Secured to the short arm of the bell-crank lever is the upper end of a coiled spring 14, the lower end of which is attached to a hook 15, the stem of which is threaded and passes loosely through a bearing 16 in a bracket 17, extending rearwardly or inwardly from a plate 18, secured to the door-jamb. Upon the lower end of said stem is screwed a nut 19, having beveled teeth engaging the beveled teeth of a collar 20, secured upon the end of a shaft 21, turning in a bearing 22, formed in the lower side of said bracket. The outer end of said shaft has a screw-head 23, so that it can be turned with a screw-driver, thereby rotating the nut 19 upon the stem of the hook 15 and drawing down the spring 14, increasing its tension, or permitting it to rise, reducing the tension. The hinge-plate 2 is cut out and the jamb has a corresponding aperture, as shown at 24, to permit the compound link connecting the plate 1 and bell-crank lever 12 to pass therethrough when the door is opened. This aperture 24 is sufficiently large to permit the check, lever, and link to be passed therethrough, thereby enabling the apparatus to be assembled in the shop before being transported to the place to be used, where it can be easily secured in place by a few screws, said compound arm comprising the two short arms 6 10. The links 7 9 and the turnbuckle 8 can be adjusted in length by turning said turnbuckle.

It is evident that with this construction when the door is swung open the tension of the spring will draw down the bell-crank lever and transmit its force through said compound arm to the hinge-plate of the door to close the door.

In order to provide against too sudden closing of the door under the action of the spring 14, there is employed a check, as follows: The hinge-plate 2 is made of considerable length, as shown, and the lower portion of it is formed with the rearwardly-extending rib 26 terminating in a cylinder 27. In this cylinder slides a piston 28, attached by a rod 29 to a link 30, secured to the short arm of a bell-crank lever. A gland 31 is provided to pack said rod where it slides through the upper head 32 of the cylinder, and the lower end of the cylinder is closed by a head 33. The upper and lower portions of the liquid-chamber of the piston-cylinder are connected by a conduit 34 in the rib 26, so that when the door is closing and the piston is descending oil or other liquid in the cylinder can pass freely from the lower portion to the upper portion, and the door can readily close up to the point when the lower end of the piston arrives at the lower edge of the conduit 34. From that time the oil can flow very slowly from said portion, and consequently the door will close slowly under the action of the spring. In order to permit the oil to flow freely from the upper portion to the lower portion of the cylinder on opening the door, there is provided in the piston a tortuous passage 35, including a valve-seat 36, upon which rests a ball 37 in a valve-chamber 38, closed by a screw 39.

It is evident that when the oil is flowing from the upper to the lower portion the ball 37 will be lifted and the oil can flow freely, while passage in the opposite direction will be prevented by said ball being pressed tightly to its seat.

40 indicates a rubber buffer or stop for the bell-crank lever.

The cylinder is secured in place behind the jamb 4 and between it and the casing 44, as shown in Fig. 4, whereby it is concealed from view, thus obviating the main objection to the use of door-checks, especially in artistic or highly-decorated rooms or apartments.

By providing the hinge-plate 2 with the ears 13 for pivoting thereon the lever 12 and with the rib 26 for supporting the cylinder 27 and by providing the other hinge-plate 1 with the ears 5 for connecting thereto the link attached to the lever, the first hinge-plate being apertured to permit said link to pass therethrough, it is insured that the parts must necessarily be attached to the door and jamb, respectively, so that the whole device may operate as efficiently as possible. Thus the apparatus requires no experience or skill whatever in securing it in the best position.

I claim—

1. In a door closer, the combination, with the jamb having an aperture, of a two-armed lever pivoted at the rear of the jamb, a link connected with one arm of said lever, a plate secured to the hinged side of the door and provided with means to permit said link to be pivotally connected thereto, a spring attached at one end to the other arm of said lever, a fixed device with which the other end of the spring is connected, and means for adjusting the length of said link, substantially as described.

2. In a door closer and check, the combination with a jamb having an aperture, of a correspondingly-apertured hinge-plate secured thereto, a hinge-plate secured to the door and pivotally connected to the jamb-plate, a two-armed lever pivoted to the rear of the jamb-plate to swing vertically thereon, a link passing through said apertures and pivotally connected with one arm of the lever and with the door-plate, a spring attached to the other arm of said lever, a fixed device on the rear of the jamb with which the other end of the spring is connected, and means for controlling the action of the spring, substantially as described.

3. In a door closer and check, the combination with a jamb having an aperture, of a correspondingly-apertured plate secured thereto, a plate secured to the door, a two-armed lever pivoted to the rear of the jamb-plate to swing vertically thereon, a link passing through said apertures and movably connected with one arm of said lever, said arm swinging into a position substantially parallel with said jamb-plate when the door is open, a spring attached to the other arm of said lever behind the jamb and operating to close the door, said other arm swinging through a horizontal position in closing the door, a fixed device on the rear of the jamb with which the other end of the spring is connected, and means for controlling the action of the spring, substantially as described.

4. In a door closer and check, the combination, with the jamb having an aperture, of a correspondingly-apertured plate secured to the jamb, a lever having a long arm and a short arm, pivoted to the rear surface of said plate to swing vertically thereon, a link connected with the long arm of the lever, a plate secured to the hinged side of the door and pivotally connected with said link, a spring attached to the short arm of the lever behind the jamb and operating to close the door, and means for controlling said spring, comprising a cylinder and a piston sliding therein, one of the elements of said controlling mechanism being operatively connected with the short arm of the lever between the pivot and the spring, and the other element being connected with the plate, said cylinder being provided with means for permitting the free movement of the piston in one direction, but obstructing the close of its movement in the opposite direction, substantially as described.

5. In a door closer and check, the combination, with a jamb having an aperture, of an apertured plate secured to the jamb, provided with two rearward projections, a lever pivoted on the first projection, a check-cylinder and a piston movable in said cylinder; one of said check members being supported by the second projection, and the other check member being movably connected with the lever, a link movably connected with said lever, and a second plate secured to the door and connected with said link, substantially as described.

6. In a door closer and check, the combination of an apertured plate provided on one side with a fulcrum for a lever and with means for supporting a checking device, a lever pivoted on said fulcrum, a check comprising a cylinder and a piston whereof one member is secured to said supporting means and the other member is secured to said lever, a link connected at one end to an arm of said lever and arranged to pass through the aperture in the plate, a spring connected to said lever, a door, and means for securing the other end of the link to the door, and a door-jamb to which said plate is secured, said jamb having an aperture sufficiently large to permit the check, lever, and link to be passed thereinto, substantially as described.

7. In a door closer and check, the combination of an apertured plate provided on one side with a fulcrum for a lever and with means for supporting a check member, a lever pivoted on said fulcrum, a check comprising a cylinder and a piston whereof one member is secured to said supporting means and the other member is secured to said lever, a link connected at one end to an arm of said lever and arranged to pass through the aperture in the plate, a spring connected to said lever, a door, and means for securing the other end of the link to the door, a second plate and means carried thereby for attaching the other end of the spring, and a door-jamb to which said plate is secured, said jamb having an aperture sufficiently large to permit the check, lever, and link to be passed thereinto, and having also an aperture permitting the insertion of parts carried by the second plate, substantially as described.

8. In a door closer and check, the combination of a lever, an operative connection between said lever and door for closing the same, a spring for operating said lever, and means for controlling the operation of said spring, said means comprising a cylinder, a piston sliding therein and operatively connected with said lever, the cylinder having a passage between the upper and lower portions thereof and the piston having a tortuous passage, formed with a valve-chamber, the lower end of said valve-chamber forming a valve-seat, and a ball on said seat, substantially as described.

9. In a door-closer, the combination of a lever pivotally secured behind the jamb of the door, a link connected to said lever and to the door, a spring for operating said lever, and means for adjusting the tension of said spring, comprising a hook attached to the end of the spring and threaded at its other end, a nut on said threaded end having bevel-teeth, a bracket having a bearing through which the hook passes and also having a bearing for a shaft, a shaft in said latter bearing having bevel-teeth on its end engaging the bevel-teeth on the nut, and means provided at the other end of the shaft for turning the same to move the hook longitudinally, substantially as described.

In witness whereof I have hereunto set my hand in the presence of two subscribing witnesses.

GEO. RISCHMULLER.

Witnesses:
FRANCIS M. WRIGHT,
BESSIE GORFINKEL.